(12) United States Patent
Veltrop et al.

(10) Patent No.: US 10,583,559 B2
(45) Date of Patent: Mar. 10, 2020

(54) HUMANOID ROBOT WITH AN AUTONOMOUS LIFE CAPABILITY

(71) Applicant: SOFTBANK ROBOTICS EUROPE, Paris (FR)

(72) Inventors: Taylor Veltrop, Paris (FR); Bruno Maisonnier, Paris (FR); Jérôme Monceaux, Paris (FR)

(73) Assignee: SOFTBANK ROBOTICS EUROPE, Paris (FR)

( * ) Notice: Subject to any disclaimer, the term of this patent is extended or adjusted under 35 U.S.C. 154(b) by 100 days.

(21) Appl. No.: 15/129,399

(22) PCT Filed: Apr. 17, 2015

(86) PCT No.: PCT/EP2015/058355
§ 371 (c)(1),
(2) Date: Sep. 26, 2016

(87) PCT Pub. No.: WO2015/158877
PCT Pub. Date: Oct. 22, 2015

(65) Prior Publication Data
US 2017/0120446 A1 May 4, 2017

(30) Foreign Application Priority Data
Apr. 17, 2014 (EP) .................................... 14305578

(51) Int. Cl.
*B25J 9/16* (2006.01)
*B25J 11/00* (2006.01)
(Continued)

(52) U.S. Cl.
CPC ............. *B25J 9/1661* (2013.01); *B25J 9/163* (2013.01); *B25J 11/0005* (2013.01);
(Continued)

(58) Field of Classification Search
CPC .................. G06N 3/008; Y10S 901/01; G05D 2201/0217; G05D 1/0088; B25J 13/088;
(Continued)

(56) References Cited

U.S. PATENT DOCUMENTS

2002/0198626 A1* 12/2002 Imai ........................ G06N 3/008
700/245
2004/0015265 A1* 1/2004 Asano .................... B25J 13/003
700/245
(Continued)

FOREIGN PATENT DOCUMENTS

CN 1304177 C 3/2007
CN 101795830 A 8/2010
(Continued)

*Primary Examiner* — Jason Holloway
(74) *Attorney, Agent, or Firm* — Baker & Hostetler LLP (57) ABSTRACT

A humanoid robot which is capable of surveying its environment, notably to determine when humans are present and to engage in Activities with humans corresponding to an evaluation of their desires is provided. An operating system of the robot is configured in the robot to process the information received by Extractors (sensors and processing capabilities), to list Activities (gestures, dialogs, etc. . . . ) which are prioritized as a function of the current conditions and the history of engagement with the humans, to decide which Activity is to be launched and to have Actuators execute the Activity. Safeguard conditions of the robot are also taken into account in the list of Activities to be performed.

12 Claims, 5 Drawing Sheets

(51) Int. Cl.
*G06N 3/00* (2006.01)
*G05D 1/00* (2006.01)
*B25J 9/00* (2006.01)

(52) U.S. Cl.
CPC .......... *G05D 1/0088* (2013.01); *G06N 3/008* (2013.01); *B25J 9/0006* (2013.01); *B25J 9/1679* (2013.01); *G05B 2219/39254* (2013.01); *G05B 2219/40202* (2013.01)

(58) Field of Classification Search
CPC ........ B25J 9/0003; B25J 9/163; B25J 13/081; B25J 9/1661; B25J 11/0005; G05B 2219/35472; G05B 2219/39254; G05B 2219/40202
See application file for complete search history.

(56) References Cited

U.S. PATENT DOCUMENTS

| | | | | |
|---|---|---|---|---|
| 2004/0167668 A1* | 8/2004 | Wang | ............... | G06F 19/3418 700/248 |
| 2004/0202351 A1* | 10/2004 | Park | ............... | G05D 1/0234 382/104 |
| 2004/0243281 A1* | 12/2004 | Fujita | ............... | B25J 9/1602 700/245 |
| 2005/0091684 A1* | 4/2005 | Kawabata | ............... | B25J 9/0003 725/35 |
| 2005/0215171 A1* | 9/2005 | Oonaka | ............... | A63H 3/28 446/301 |
| 2007/0192910 A1 | 8/2007 | Vu | | |
| 2007/0203613 A1* | 8/2007 | Huang | ............... | B25J 13/087 700/245 |
| 2008/0221730 A1* | 9/2008 | Sakata | ............... | G06N 3/004 700/245 |
| 2009/0149991 A1 | 6/2009 | Sumida et al. | | |
| 2012/0303160 A1* | 11/2012 | Ziegler | ............... | B25J 5/007 700/259 |
| 2014/0142757 A1* | 5/2014 | Ziegler | ............... | B25J 5/007 700/255 |

FOREIGN PATENT DOCUMENTS

| | | |
|---|---|---|
| JP | 2003-266353 A | 9/2003 |
| JP | 2004-283956 A | 10/2004 |
| JP | 2004-283958 A | 10/2004 |
| JP | 2006-110707 A | 4/2006 |
| JP | 2006-205343 A | 8/2006 |
| JP | 2007-41204 A | 2/2007 |
| JP | 2007-44825 A | 2/2007 |
| JP | 2008-238383 A | 10/2008 |
| JP | 2009-61547 A | 3/2009 |
| JP | 2009-136967 A | 6/2009 |
| JP | 4396273 B2 | 1/2010 |
| JP | 2011-177875 A | 9/2011 |
| WO | 2010/136427 A1 | 12/2010 |
| WO | 2011/003628 A2 | 1/2011 |
| WO | 2012/000927 A1 | 1/2012 |
| WO | 2012/079926 A1 | 6/2012 |

* cited by examiner

HUMANOID ROBOT WITH AN AUTONOMOUS LIFE CAPABILITY

CROSS-REFERENCE TO RELATED APPLICATIONS

This application is a National Stage of International patent application PCT/EP2015/058355, filed on Apr. 17, 2015, which claims priority to foreign European patent application No. EP 14305578.8, filed on Apr. 17, 2014, the disclosures of which are incorporated by reference in their entirety.

FIELD OF THE INVENTION

Background

The present invention relates to the field of robot programming systems. More specifically, it applies to the editing and controlling of behaviors and motions of robots which move around on articulated limbs or use them, notably robots of human or animal form. A robot can be qualified as humanoid from the moment when it has certain human appearance attributes: a head, a trunk, two arms, two hands, etc. A humanoid robot may, however, be more or less sophisticated. Its limbs may have a greater or lesser number of articulations. It may control its own balance statically and dynamically and walk on two limbs, possibly in three dimensions, or simply roll over a base. It may pick up signals from the environment ("hear", "see", "touch", "sense", etc.) and react according to more or less sophisticated behaviors, and interact with other robots or humans, either by speech or by gesture. For a current generation of humanoid robots, programmers are capable of creating scenarios, which can be more or less sophisticated, as sequences of events/actions reacted to/performed by the robot. These actions can be conditional upon certain behaviors of people who interact with the robot. But in these humanoid robots of the first generation, application programming is done in a development toolkit and each application needs to be launched by a triggering event the occurrence of which has been included in the application.

SUMMARY OF THE INVENTION

There is therefore a need for a humanoid robot capable of living an "autonomous life", as a human being does, who is capable of behaving in a determined manner, depending on the environment he is evolving in. It is an object of the present invention to overcome the limitations of the robots of the prior art by providing a robot who is capable of determining autonomously sequences of its life adapted to the context it is evolving in, without any intervention of a programmer.

To this effect, the invention provides a humanoid robot comprising at least: a memory connected to a processing capability for retrieving and storing activities for execution by the robot, an activity composed of a pair of a pre-programmed behavior of the robot and a manifest file with launch conditions of said behavior; extractors of image, sound, touch and inertial signals characterizing one or more of a situation, an event and an interaction with a human being in a scene surrounding the robot; actuators of one or more action of a light signal, a displayed information, a sound, a speech, a movement, said one or more action belonging to a behavior; said humanoid robot being characterized in that it further comprises a mind module for automatically creating a prioritized list of activities, selecting at least one activity in the prioritized list and commanding execution of said activity to one or more actuators.

Advantageously, the memory is further configured to store data allowing matching of an identification data of a human being with whom the robot interacts and predefined parameters of said interaction.

Advantageously, the prioritized list of activities is created based on one or more of a determination of a presence of a human being in a situation to communicate with the robot, a preference to conduct autonomous activity and a capability to perform any activity at all.

Advantageously, after a determination of a presence of a human being in a situation to communicate with the robot has been made, a plurality of engagement zones are defined around the robot.

Advantageously, the plurality of engagement zones are defined by a distance between the human being and the robot.

Advantageously, the plurality of engagement zones vary based on an evolution of a context of an interaction between the human being and the robot.

Advantageously, after a determination of a presence of a human being in a situation to communicate with the robot has been made, an extractor service keeps tracking said human being during performance of other activities.

Advantageously, wherein the prioritized list of activities is created based on a determination of preferred activities of a human being with whom the robot has already interacted.

Advantageously, the order in the prioritized list of activities is set by firstly, taking into account constraints to safeguard the robot, secondly, a presence of one or more human being in one of the engagement zones, thirdly, activities which can be performed autonomously by the robot.

Advantageously, the robot of the invention further comprises a resource manager to contribute to the ordering of the list of prioritized activities.

Advantageously, the prioritized list of activities is randomized before execution of a first activity in the prioritized list.

The invention also provides a method for controlling a humanoid robot comprising: retrieving and storing activities for execution by the robot, an activity composed of a pair of a pre-programmed behavior of the robot and a manifest file with launch conditions of said behavior; retrieving from one or more extractors of image, sound, touch and inertial signals characterizing one or more of a situation, an event and an interaction with a human being in a scene surrounding the robot; activating one or more actuators of one or more action of a light signal, a displayed information, a sound, a speech, a movement, said one or more action belonging to a behavior; said method being characterized in that it further comprises automatically creating in a mind module a prioritized list of activities, selecting at least one activity in the prioritized list and commanding execution of said activity to the one or more actuators.

The invention also provides a computer program comprising computer code fit for executing when running on a computer the method of the invention.

The invention provides the functionalities of an operating system, i.e. it allows the decoupling between the commands generated by the output of the sensors of the robot and the application which defines behaviors for different values of the sensor readings. This allows modularity of the computer code and, therefore, collaborative programming, i.e. members of a community can contribute different applications which will work even if access to the low level programming functions is not permitted. Thanks to the software architecture of the invention, there is no need to connect a development toolkit to the robot to be able to launch an application. Also, decoupling allows easier maintenance. It is also possible, thanks to the invention, to establish priorities in the behaviors of the robot, depending on whether the robot is in a situation where it has to interact with one or more human beings (Interactive mode), whether it has no human being in its environment (Autonomous mode), or whether it is at risk for a specific reason (Safeguard, because of low batteries, fall or other reason).

BRIEF DESCRIPTION OF THE DRAWINGS

The invention will be better understood and its various features and advantages will emerge from the following description of a number of exemplary embodiments and its appended figures in which.

DETAILED DESCRIPTION

Figure 1:
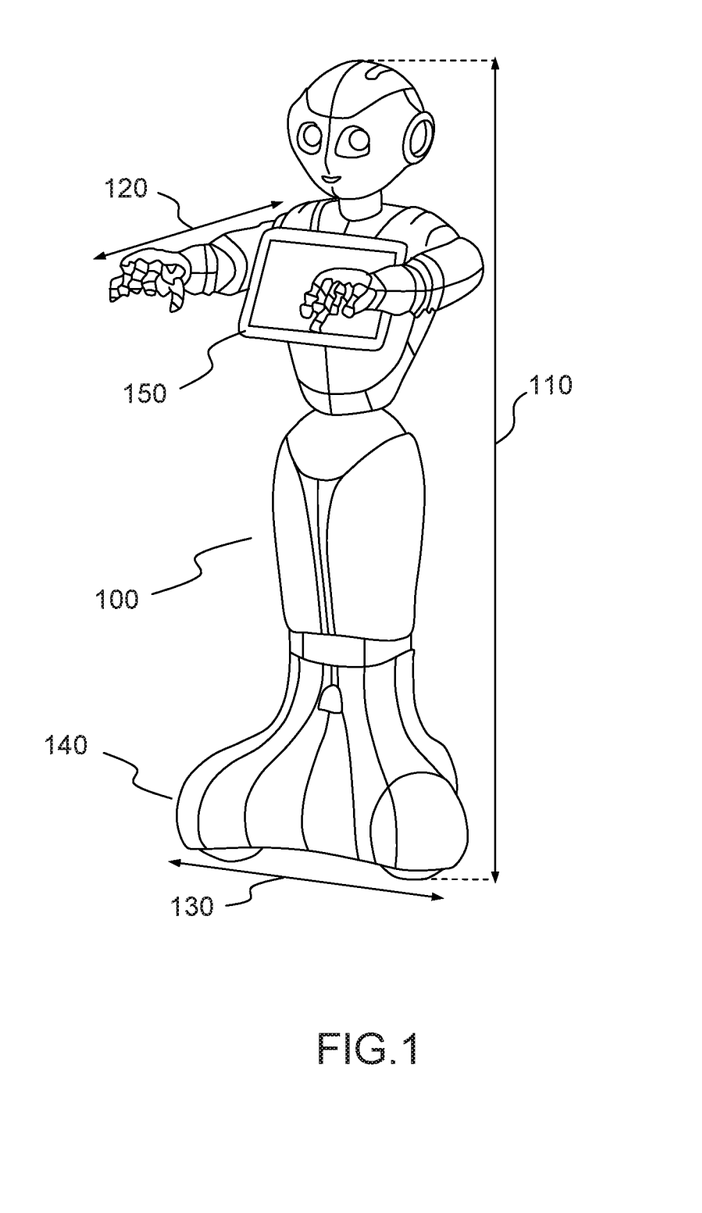
FIG. 1 displays a physical architecture of a humanoid robot in a number of embodiments of the invention.

FIG. 1 displays a physical architecture of a humanoid robot in a number of embodiments of the invention.

The specific robot 100 on the figure is taken as an example only of a humanoid robot in which the invention can be implemented. The lower limb of the robot on the figure is not functional for walking, but can move in any direction on its base 140 which rolls on the surface on which it lays. The invention can be easily implemented in a robot which is fit for walking. By way of example, this robot has a height 110 which can be around 120 cm, a depth 120 around 65 cm and a width 130 around 40 cm. In a specific embodiment, the robot of the invention has a tablet 150 with which it can communicate messages (audio, video, web pages) to its environment, or receive entries from users through the tactile interface of the tablet. In addition to the processor of the tablet, the robot of the invention also uses the processor of its own motherboard, which can for example be an ATOM™ Z530 from Intel™. The robot of the invention also advantageously includes a processor which is dedicated to the handling of the data flows between the motherboard and, notably, the boards bearing the Magnetic Rotary Encoders (MREs) and sensors which control the motors of the joints in a limb and the balls that the robot uses as wheels, in a specific embodiment of the invention. The motors can be of different types, depending on the magnitude of the maximum torque which is needed for a definite joint. For instance, brush DC coreless motors from e-Minebea™ (SE24P2CTCA for instance) can be used, or brushless DC motors from Maxon™ (EC45_70W for instance). The MREs are preferably of a type using the Hall effect, with 12 or 14 bits precision.

In embodiments of the invention, the robot displayed on FIG. 1 also comprises various kinds of sensors. Some of them are used to control the position and movements of the robot. This is the case, for instance, of an inertial unit, located in the torso of the robot, comprising a 3-axes gyrometer and a 3-axes accelerometer. The robot can also include two 2D color RGB cameras on the forehead of the robot (top and bottom) of the System On Chip (SOC) type, such as those from Shenzen V-Vision Technology Ltd™ (OV5640), with a 5 megapixels resolution at 5 frames per second and a field of view (FOV) of about 57° horizontal and 44° vertical. One 3D sensor can also be included behind the eyes of the robot, such as an ASUS XTION™ SOC sensor with a resolution of 0.3 megapixels at 20 frames per second, with about the same FOV as the 2D cameras. The robot of the invention can also be equipped with laser lines generators, for instance three in the head and three in the base, so as to be able to sense its relative position to objects/beings in its environment. The robot of the invention can also include microphones to be capable of sensing sounds in its environment. In an embodiment, four microphones with a sensitivity of 300 mV/Pa+/−3 dB at 1 kHz and a frequency range of 300 Hz to 12 kHz (−10 dB relative to 1 kHz) can be implanted on the head of the robot. The robot of the invention can also include two sonar sensors, possibly located at the front and the back of its base, to measure the distance to objects/human beings in its environment. The robot can also include tactile sensors, on its head and on its hands, to allow interaction with human beings. It can also include bumpers on its base to sense obstacles it encounters on its route.

To translate its emotions and communicate with human beings in its environment, the robot of the invention can also include:

LEDs, for instance in its eyes, ears and on its shoulders;
Loudspeakers, for instance two, located in its ears.

The robot of the invention may communicate with a base station or other robots through an Ethernet RJ45 or a WiFi 802.11 connection.

The robot of the invention can be powered by a Lithium Iron Phosphate battery with an energy of about 400 Wh. The robot can access a charging station fit for the type of battery that it includes.

Position/movements of the robots are controlled by its motors, using algorithms which activate the chains defined by each limb and effectors defined at the end of each limb, in view of the measurements of the sensors.

Figure 2:
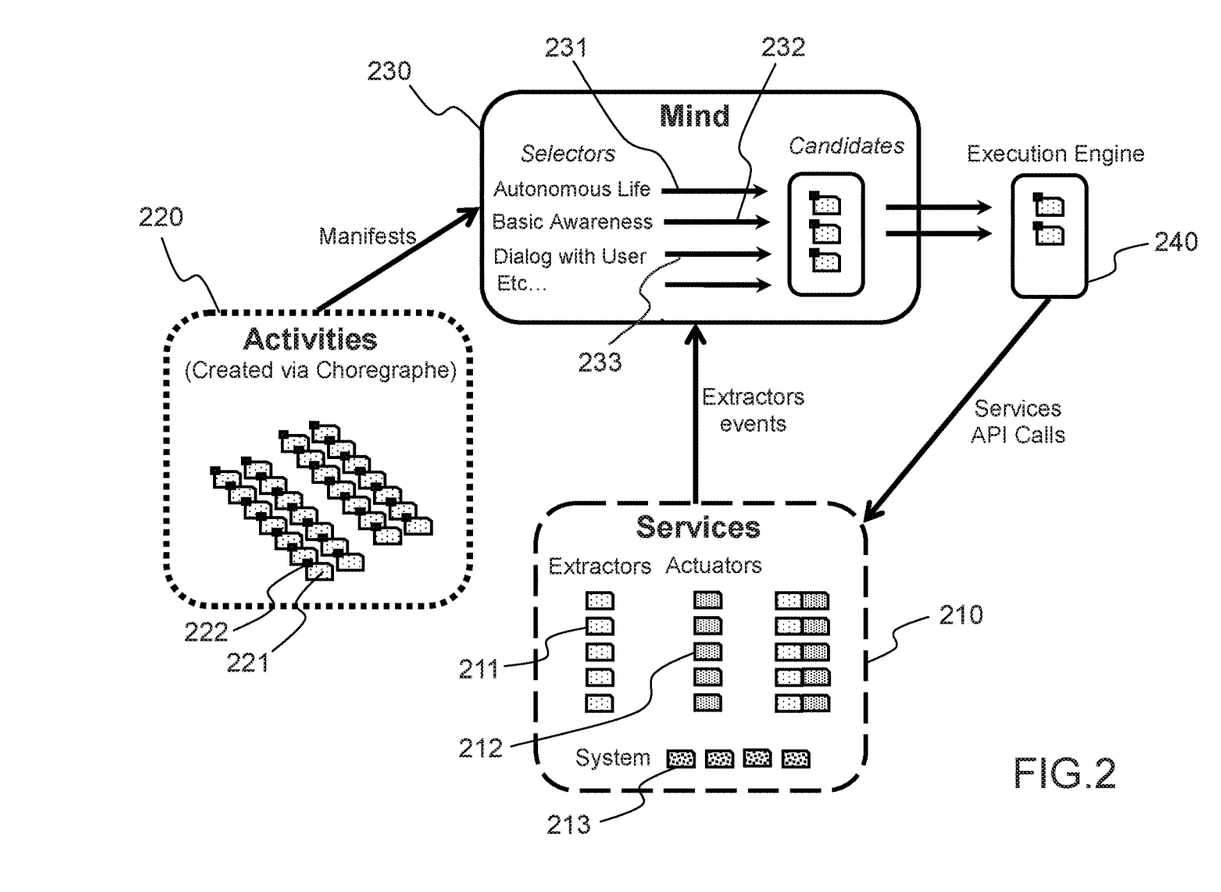
FIG. 2 displays a functional architecture of the software modules of a humanoid robot in a number of embodiments of the invention.

FIG. 2 displays a functional architecture of the software modules of a humanoid robot in a number of embodiments of the invention.

The goal of the invention is to provide a method to allow a humanoid robot to perform activities in an autonomous way, without any intervention of a programmer to anticipate the conditions that the robot will face. In the prior art, such as disclosed in a number of patents or patent applications which are assigned to the applicant, such as European patent applications published under n° EP2435216, EP2451617, EP2588209, the robot will be capable of executing scenarios which have been programmed and uploaded to its motherboard. These scenarios can include reactions to conditions which vary in its environment, but the robot will not be capable to react to conditions which have not been predicted and included in the code uploaded to its motherboard or accessed distantly. In contrast, the goal of the invention is to allow the robot to behave autonomously, even in view of events/conditions which have not been predicted by a programmer. This goal is achieved by the functional architecture which is displayed on FIG. 2.

This functional architecture comprises in essence four main software modules.

A Services module 210, includes services of at least three types:

Extractor Services 211, which receives as input readings from the robot sensors of the type described in relation with FIG. 1; these sensor readings are preprocessed so as to extract relevant data in relation to the position of the robot, identification of objects/human beings in its environment, distance of said objects/human beings, words pronounced by human beings or emotions thereof; example of Extractor Services are: People Perception, to perceive the presence of human beings in the vicinity of the robot, Movement Detection, to detect the movements of these human beings; Sound Localization, to locate a sound, Touch Detection to interpret a touch on a robot tactile sensor, Speech Recognition, Emotion Recognition, to identify the emotion expressed by a human being in the vicinity of the robot, through its words or gestures;

Actuator Services 212, which control physical actions of the robot, such as Motion, to activate the motors of the joints or the base, Tracker, to follow motion of a human being in the environment of the robot, lighting of the robot's LEDs, to communicate emotions, Animated Speech (combinations of speech and gestures), Behaviors; behaviors are a combination of movements, words, lightings which may express emotions of the robot and allow it to perform complex actions;

System Services 213, which notably include Data Services; Data Services provide stored data, either transiently or long-term; examples of Data Services are:
  User Session Service, which stores user data, and their history of what they have done with the robot;
  Package Manager Service, which provides a scalable storage of procedures executed by the robot, with their high level definition, launch conditions and tags.

An Activities module 220 includes behaviors 221 of the robot which have been preprogrammed. The programming of the Behaviors can be effected using a graphical integrated development environment (Choregaphe™) which is the object of a European patent application published under n° EP2435216, which is assigned to the applicant of this patent application. Behaviors programmed with Choregaphe™ combine a time based logic and an event based logic. Each Behavior is tagged with a Manifest 222, which is a text file which includes notably the launch conditions of the Behavior.

A mind module 230 ties together the Services and the Activities module by controlling the selection of the Activities, which launch the Actuators based on the readings of the Extractors and on algorithms performed in the mind module called Selectors. Examples of Selectors are:
  Autonomous Life 231, which executes Activities; based on the context of a situation, the mind module can tell Autonomous Life on which activity to focus (see examples below); any Activity has full access to all call procedures of the module API; Activities can include a constraint which will direct Autonomous Life to focus on a definite Activity;
  Basic Awareness 232, which subscribes to Extractor Services such as People Perception, Movement Detection, and Sound Localization to tell the Motion Service to move; the mind module configures Basic Awareness's behavior based on the situation; at other times, Basic Awareness is either acting on its own, or is being configured by a running Activity;
  Dialog 233, which subscribes to the Speech Recognition Extractor and uses Animated Speech Actuator Service to speak; based on the context of a situation, the mind module can tell the Dialog what topics to focus on; metadata in manifests tie this information into the mind module; Dialog also has its algorithms for managing a conversation and is usually acting on its own.

An Execution Engine 240 launches the API calls to invoke the Services.

Figure 3:
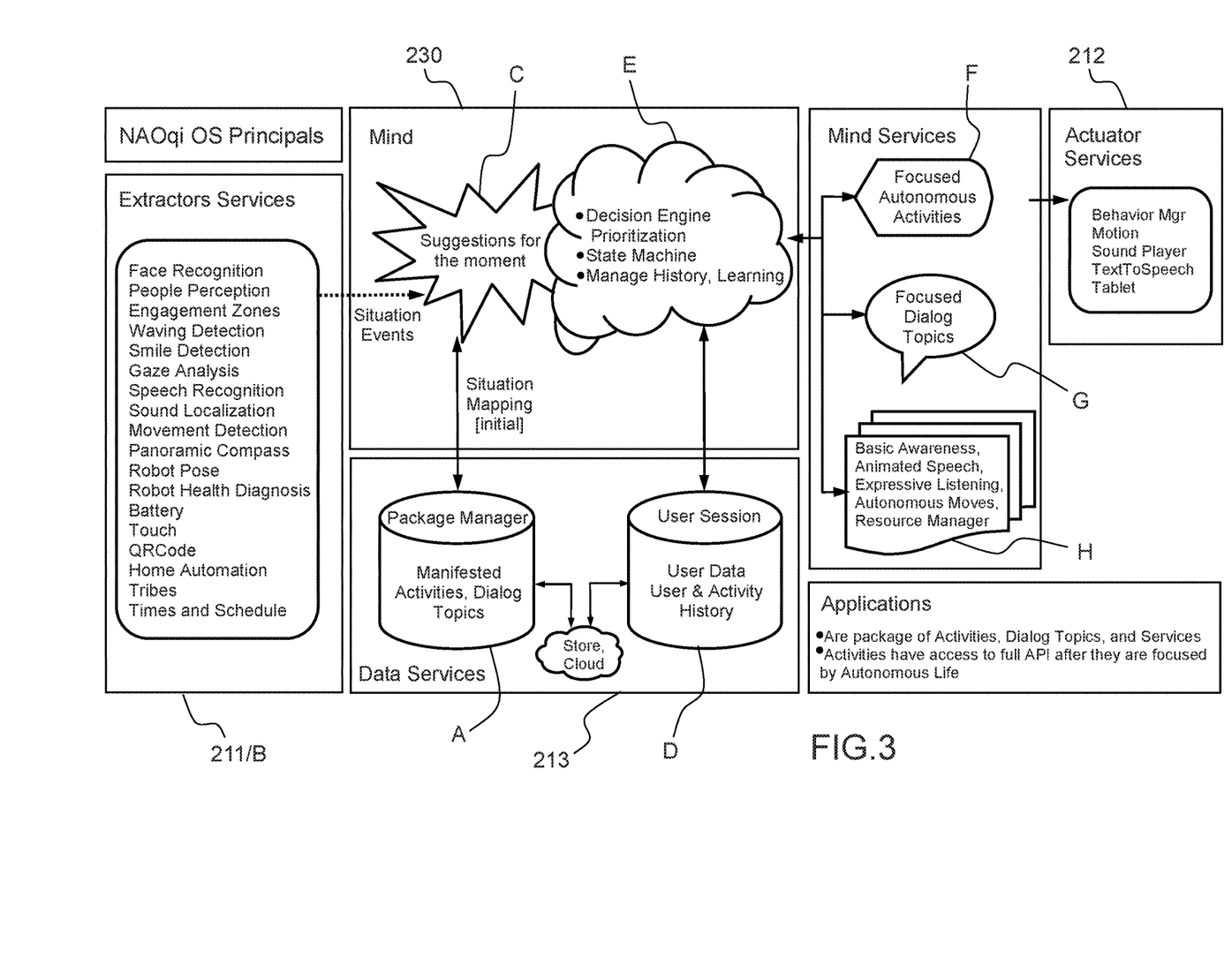
FIG. 3 displays a flow diagram of the operation of the functional architecture of the software modules of FIG. 2.

FIG. 3 displays a flow diagram of the operation of the functional architecture of the software modules of FIG. 2.

The architecture of FIG. 2 performs the functions of an operating system (named NAOqi™ OS), in the sense that it includes basic services (Extractors 211, Actuators 212, Data 213, Activities 220) that a programmer has not to go into to modify parameters to make them work together.

NAOqi™ OS provides the mechanisms to allow the autonomous starting of the most relevant installed Activity. This Activity contains a Manifest that contains its launching conditions. These launching conditions are based on what the OS extractors are able to perceive (e.g. try to launch whenever there are more than two people around the robot, or any other condition that would be determined to fit the use conditions of the robot).

The mind module is in charge of selecting one or several Activities to launch. To do so, the mind module subscribes to the OS Extractors and evaluates the launching conditions of all the installed Activities. The variables of these conditions are event based. An event condition can be made to depend on time by adding to the event an indication of a time lag for the duration of which (i.e. a number of seconds) the system will wait before the listed Activity is launched. So, efficiently, only the condition statements that contain changed variables need to be reevaluated. Based on the results of the sorting algorithm, its priorities, and the life cycle (see below), Activities may be launched, and some Activities possibly stopped.

An executed Activity will rely on API calls to the OS Services (including Extractors, Actuators, and mind module services) to perform the task it has been programmed to do. Whenever an Activity is focused or launched, or stopped during execution, the mind module collects data about when this happened, the then current state of conditions, and what the user feedback seemed to be to facilitate learning (see further down in the description).

If an existing Extractor event is not sufficient for the conditions, developers can create an additional Extractor to generate a new event, and distribute it in a package with their application.

Life Activities and Dialog Topics (i.e. Activities which the robot can execute autonomously or based on trigger conditions, for instance when it is in a situation to communicate with a human being) can also programmatically tell the mind module to switch focus to a different Activity or Topic at any time.

One example of possible algorithm to determine the Activities to be launched is described below:
  At the moment that an activity's launch conditions become true or false, a list of all possible Activities for the moment is sent to the mind module;
  The list is filtered according to activity prioritization (as further described below);
  The list order is randomized;
  The list is sorted (or scored) to give precedence to Activities that are "unique" and have been started less often;
  A special check to make sure the top Activity in this list isn't the same activity as the previous activity that was executed.
  The list is again sorted and filtered according to the preferences of the users.

By way of example only, detection of a smiling human will be used as a criteria to list Activities which are candidate for launch where the robot displays an empathic behavior (smile, kind words, etc. . . . ). This is achieved by an Emotion Recognition module which is one of the Extractors. Also, this Emotion Recognition module is used in a feedback loop to tag the Activities which have been executed in the presence of a determined human as a function of the reaction of this human, and create a priority list for engaging with said determined human.

Randomization is used so that, when two Activities or more with the same priorities are listed to be launched, an Activity which has already been executed just previously has not more probability to be launched than the other listed Activities. A randomized behavior will look as being less "mechanical" than a succession of Activities which may come top of the list for a number of reasons.

On FIG. 3, the following notations will be used to represent the different steps in the data flows of the examples which are provided further below in the description:

A: Package Manager;
B: Extractors;
C: Activity Suggestions;
D: User+Historic Data;
E: Mind Module Prioritization;
F: Focused Autonomous activity
G: Focused Dialog Topic;
H: Configure other Mind Module services.

Figure 4:
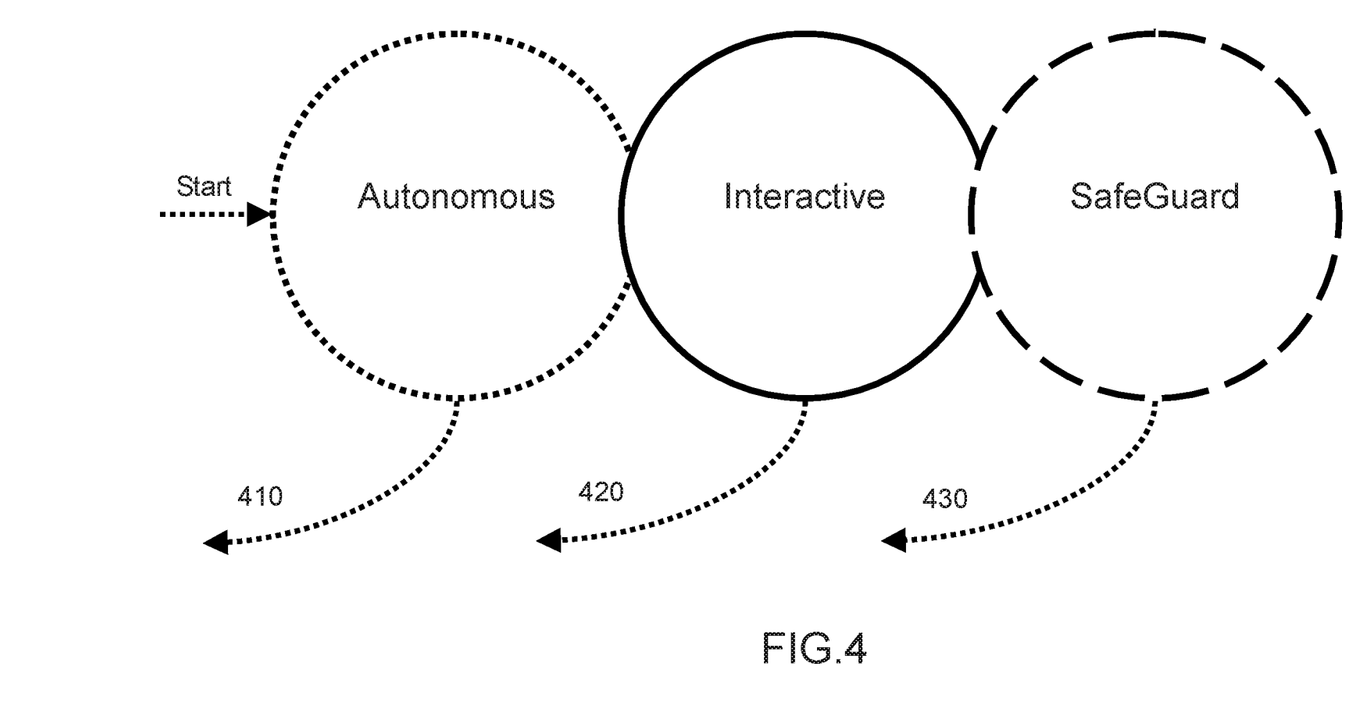
FIG. 4 illustrates a prioritization algorithm in a number of embodiments of the invention.

FIG. 4 illustrates a prioritization algorithm in a number of embodiments of the invention.

Initially, when the robot is powered on, the mind module is in a plain autonomous state, with no Activity or Dialog executing. The mind module configures the Basic Awareness service to track sounds and movements in a way optimized for discovering humans. When the conditions for an Autonomous Activity are true, the mind module will start the Activity if possible. Prioritization of the Activity determines the possibilities. In a preferred embodiment, three main priorities are defined in increasing, Autonomous, Interactive, and SafeGuard, according to the following rules:

If no Activity is running, a SafeGuard 430, Interactive 420, or regular Autonomous 410 can be started;

If an Autonomous Activity is already focused, only Interactive or Safeguard priorities can be started and the Autonomous Activity will be interrupted and stopped;

If an interactive priority activity is focused, only a Safeguard can be started, which will interrupt the current interactive priority Activity;

If a Safeguard is focused, only a higher level Safeguard can be focused which will interrupt the current one.

Additional priorities are Passive Autonomous, Passive Interactive, and Parallel Reaction:

A Passive Autonomous Activity is one that can be interrupted by a Normal Autonomous activity and is otherwise the same as a Normal Autonomous Activity;

A Passive Interactive is one that can be interrupted by a Normal Interactive Priority Activity, and is otherwise the same as an Interactive Priority Activity;

A Single Parallel Reaction activity can occur in parallel with a (Passive) Autonomous or Interactive Priority Activity, but not during a Safeguard Priority Activity. These are dependent on a Resource Manager to not conflict with the running Activity; a Resource Manager which can be used in combination with the OS of the invention is disclosed in European patent application published under n° EP 2651607.

Before a new interactive or solitary Activity is being focused, the mind module configures the robot to default parameters, so that apps will be started from a known state, e.g. ensuring that all self-collision-avoidance motion animation features are enabled. If a developer of a previous Activity had disabled these features, it is sure to be set back to normal before the next Activity starts. As defined by configuration, the mind module parameterizes other modules at a higher level. When it is in an Interactive Priority Activity, it configures an Autonomous Moves Activity to move around occasionally to reduce the blind spots of the robot's sensors, for user safety. In an Interactive Priority Activity, it also configures the Basic Awareness Service to track humans in a way optimized for conversation. Additional mind module services can be added to the system, and dynamically configured at runtime according to conditions and states. Based on the current autonomous priority, the mind module will activate needed Extractors to get conditional context. When in an Interactive Priority Activity, this subset is reduced/optimized for human conversation.

Figure 5:
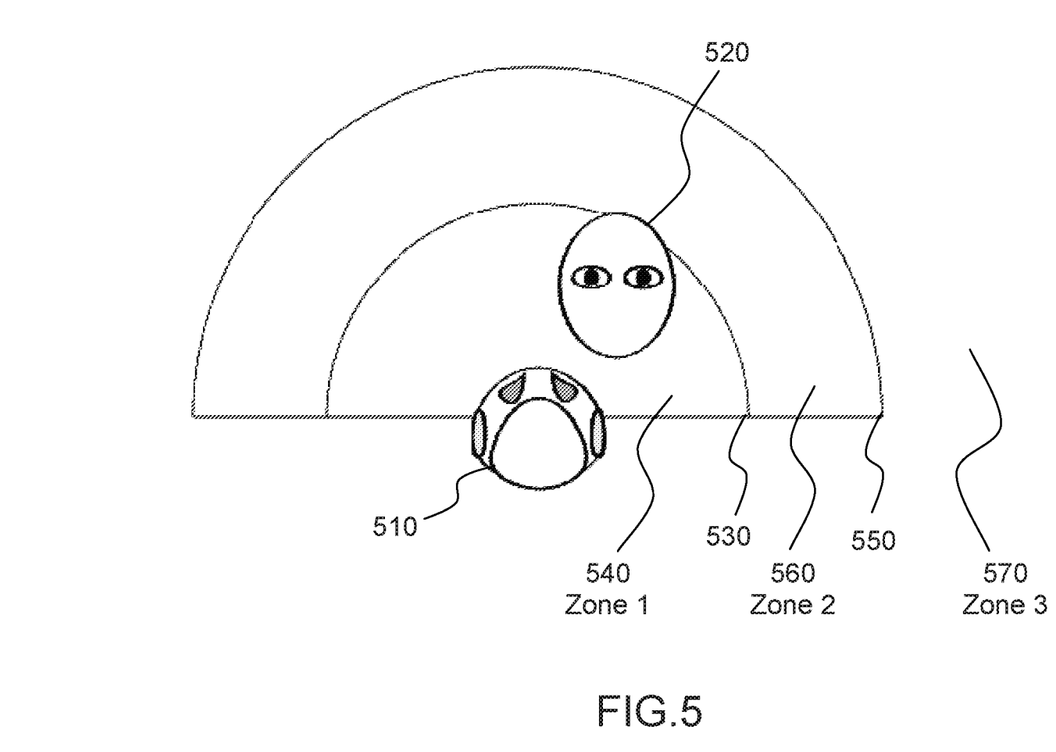
FIG. 5 displays a schematics to determine engagement zones around the robot in a number of embodiments of the invention.

FIG. 5 displays a schematics to determine engagement zones around the robot in a number of embodiments of the invention.

Various scenarios are described below to illustrate the operation of the robot of the invention in a number of its embodiments. The examples are dependent on the humans' location 520 in relation to the robot 510 in the numbered 'engagement zones' 540, 560, 570 delimited by the boundaries in this diagram, 530, 550. These EngagementZones shape and size are dynamically configurable at runtime. EngagementZones is an extractor service.

Reconfigurable engagement zones are an efficient way to determine when the robot should interact with a human in its environment. This is because with such a process, there is no need to permanently run all the Extractor services, especially those which use a significant amount of power (energy and computer), like People Perception. Therefore, when this service has "acquired" a human in the vicinity of the robot, the mind module uses a simplified tracking mode which is based on the "engagement zone" concept explained above. Alternatively, the People Perception service can be kept running in a full tracking mode, thus allowing longer range and more precise interactions. The full tracking mode can, for instance, be activated when the robot is in a situation to communicate, either directly, or through a communication link, with the robot.

The following activities are installed on the robot (Item B in the flow diagram of FIG. 3)

Activity 1:

| | |
|---|---|
| Name | Recharge Battery Casually |
| Type | Activity Behavior |
| Priority | Autonomous |
| Condition | (('BatteryPercent' < 60) ~ 30 && ! ('PeoplePresent' ~ 600))  \|\| ('BatteryPercent' < 30) ~ 30 |

This will start if the battery is less than 60 percent for 30 seconds and people have not been seen 600 seconds, or if the battery is less than 30 percent for 30 seconds. But only if there are no other activities going on.

Activity 2:

| | |
|---|---|
| Name | Recharge Battery Critical |
| Type | Activity Behavior |

-continued

| | |
|---|---|
| Priority | SafeGuard 1 |
| Condition | ('BatteryPercent' < 7) ~ 30 |

This will start if the battery is less than 7 percent for 30 seconds, and not experiencing a higher safeguard.

Activity 3:

| | |
|---|---|
| Name | Low Battery Shutdown |
| Type | Activity Behavior |
| Priority | SafeGuard 10 |
| Condition | ('BatteryPercent' < 3) ~ 10 |

This will start if the battery is less than 2 percent for 10 seconds.

Activity 4:

| | |
|---|---|
| Name | I Was Pushed |
| Type | Activity Behavior |
| Priority | SafeGuard 5 |
| Condition | 'RobotHasBeenPushed' |

This will start if the robot was pushed. It will stop lower priority activity in progress. The robot will balance.

Activity 5:

| | |
|---|---|
| Name | I Bumped Something |
| Type | Activity Behavior |
| Priority | SafeGuard 5 |
| Condition | 'RobotBumpedIntoSomething' |

This will start if the robot bumped into something unexpectedly. It will stop lower priority activity in progress.

Activity 6:

| | |
|---|---|
| Name | Critical Cool Down |
| Type | Activity Behavior |
| Priority | SafeGuard 5 |
| Condition | ('AverageBodyTemperature' > 90) ~ 60 |

This will start if the robot overheats. It will stop lower priority activity in progress. The robot will go to a cool position, and after it cools off the activity will exit.

Activity 7:

| | |
|---|---|
| Name | Propose Tall Person |
| Type | Dialog Topic |
| Priority | Interactive |
| Condition | 'TrackedUserInZone' [1] && 'TrackedUserHeight' > 175.0 |

If the person the robot is tracking is in zone one, and their height is above 175 centimeters, it is possible to autonomously focus this dialog topic.

Activity 8:

| | |
|---|---|
| Name | Propose Sports |
| Type | Dialog Topic |
| Priority | Interactive |
| Condition | 'TrackedUserInZone' [1] |

If the person the robot is tracking is in zone one, it is possible to autonomously focus this dialog topic.

Activity 9:

| | |
|---|---|
| Name | Propose Winter Season |
| Type | Dialog Topic |
| Priority | Interactive |
| Condition | 'TrackedUserInZone' [1] && ('Month' >= 12 || 'Month' <= 2) |

If the person the robot is tracking is in zone one, and the date is between December and February, it is possible to autonomously focus this dialog topic. Note that this could be installed on the robot exclusively seasonally too.

Activity 10:

| | |
|---|---|
| Name | Generic Small Talk |
| Type | Dialog Topic |
| Priority | Interactive |
| Condition | 'NumPeopleInZone' [1] >= 1 |

If the person the robot is tracking is in zone one, it is possible to autonomously focus this dialog topic.

Activity 11:

| | |
|---|---|
| Name | Provoke Smiling People |
| Type | Activity Behavior |
| Priority | Autonomous |
| Condition | ('NumPeopleInZone' [2] >= 2) ~ 5 && 'NumPeopleSmilingInZone' [2] >= 1 |

If there are at least 2 people in zone 2 for at least 5 seconds, and at least one person in zone 2 is smiling, it is possible to focus this activity.

Activity 12:

| | |
|---|---|
| Name | Smile Conversation |
| Type | Dialog Topic |
| Priority | Not focused autonomously, used programatically from Provoke Smiling Guys |
| Condition | Not focused autonomously, used programatically from Provoke Smiling Guys |

This dialog topic is only used programatically from the Provoke Smiling Guys activity, and it is launched from that behavior rather than from the mind module.

Activity 13:

| | |
|---|---|
| Name | Autonomous Dancer |
| Type | Activity Behavior |
| Priority | Autonomous |
| Condition | !('ActiveTimeslots' intersects "Bedtime") && 'MusicIsPlaying' ~ 30 && 'PeoplePresent' # 600 && 'AverageBodyTemperature' < 70 && 'BatteryPercent' > 50 |

This activity can be launched if it is not during a time that has been defined as bedtime, and if music is playing for at least 30 seconds, and if people have been present anytime within the last 600 seconds, and the average tempearature of the robot is less than 70 degrees and the battery has more than 50 percent charged.

Activity 14:

| Name | Welcome Home to Family Member |
|---|---|
| Type | Activity Behavior |
| Priority | Interactive |
| Condition | 'PresentLocations' intersects "Home" && 'OwnerVisibleAfterDelay' > 21600 && 'ActiveTimeslots' intersects "Evening" && ('FocusedActivity' != "Welcome Home To Family Member") ~ 1800 |

This activity is started if the robot is in a location defined as home, and one of his owners is visible after being invisible for 21600 seconds (6 hours, and the owner of the maximum delay is reported to that condition key), and if it is during a time defined as evening, and if we have not started this same activity (for any person) within the last 1800 seconds (30 minutes).

Activity 15:

| Name | Welcome Home Conversation |
|---|---|
| Type | Dialog Topic |
| Priority | Not focused autonomously, used programatically from Welcome Home to Family Member |
| Condition | Not focused autonomously, used programatically from Welcome Home to Family Member |

This dialog topic is only used programatically from the Welcome Home to Family Member activity, and it is launched from that behavior rather than from the mind module.

Example 1

Contextually, Autonomously Provoke Human

Two people are standing in zone 2 for a while. One of them is smiling. The robot says to them "you look happy over there".
A: The installed packages are as listed before.
B: The state of the memory provided by extractors is as follows:

| ActiveTimeslots | ["Day", "Lunch"] |
|---|---|
| AverageBodyTemperature | 55 |
| BatteryPercent | 80 |
| FocusedActivity | " " |
| NumPeopleInZone | [0, 2, 0] |
| NumPeopleSmilingInZone | [0, 1, 0] |
| Month | 12 |
| MusicIsPlaying | False |
| OwnerVisibleAfterDelay | −1 |
| PeoplePresent | True |
| PresentLocations | ["America", "Chicago", "Home", "Kitchen"] |
| RobotBumpedIntoSomething | False |
| RobotHasBeenPushed | False |
| TrackedUserInZone | 2 |
| TrackedUserHeight | 165.0 |

Provoke Smiling People
D: Neither person present has any established history with the robot. "Provoke Smiling People" has been launched twice before in the day, and with different people.
E: As only one activity is suggested the final prioritized list looks like this:
Provoke Smiling People
As no activity is currently focused, the mind module will start "Provoke Smiling People".

F: The autonomous activity "Provoke Smiling People" is focused. The activity executes its program:
  The robot turns to a person so the tablet is facing them;
  A graphic appears on the tablet;
  The robot waves to them;
  Part of the smile conversation is then triggered by the activity. The robot says "You look happy over there"; and waits for a response;
  Based on what the user does, both physically or orally, the activity can do what it wants, it has control of the robot; it's possible that the activity could just decide to exit right after making a comment.
G: The dialog was not controlled directly by the mind module (E) in this case. But the activity (F) did some programmatic control of it.
H: As the robot was already configured for autonomous priority, the mind module (E) did not have to change any settings in Basic Awareness or other mind module services before starting the Activity (F). However, it is possible that the Activity (F) could have changed the tracking mode set by the Basic Awarenesses mind module service. In this case, the tracking mode set by the mind module in Autonomous Priority is "Unengaged", meaning that the robot could change its attention to anything at any moment. The activity developer could decide that "SemiEngaged" is better, which means that if Basic Awareness is stimulated, it will look at the stimulation, but always return it's attention back to the previous human. Conditions of engagement of the robot with the human in the environment are determined by the Basic Awareness functions which are constantly running in the robot.

Example 2

Contextual Activity and Interactive Priority

We will assume that the robot is still running the "Provoke Smiling People" activity of Example 1. Now, a new person, who was not previously visible, enters zone 1 from the side. He is tall. The robot says to him "How is the weather up there?"
A: The installed packages are as listed before.
B: The state of memory is as follows:

| ActiveTimeslots | ["Day", "Lunch"] |
|---|---|
| AverageBodyTemperature | 55 |
| BatteryPercent | 75 |
| FocusedActivity | "Provoke Smiling People" |
| NumPeopleInZone | [1, 2, 0] |
| NumPeopleSmilingInZone | [0, 1, 0] |
| Month | 12 |
| MusicIsPlaying | False |
| OwnerVisibleAfterDelay | −1 |
| PeoplePresent | True |
| PresentLocations | ["America", "Chicago", "Home", "Kitchen"] |
| RobotBumpedIntoSomething | False |
| RobotHasBeenPushed | False |
| TrackedUserInZone | 1 |
| TrackedUserHeight | 185.0 |

C: Based on those conditions, the following activities are possible:

Generic Small Talk
Propose Sports
Propose Tall Person

-continued

| | |
|---|---|
| Propose Winter Season | |
| Provoke Smiling People | |

D: 2 of the users have experienced Provoke Smiling People and no other activities.
The 3rd (tracked) user has not experienced any of these activities.
Provoke Smiling People has started 3 times today.
Propose Winter Season and Propose Sports have each run once today.
Generic Small Talk has run 5 times today.
Propose Tall Person has not run today.
E: The sorted list looks like this. Propose Tall Person is the Winner:

| |
|---|
| Propose Tall Person |
| Propose Winter Season |
| Propose Sports |
| Generic Small Talk |

Provoke Smiling People is removed, because all other activities were higher priority.
The rest of the sorting is determined by which activity has been started the least amount of times today.
F: Nothing to do here.
G: The mind module focuses the "Propose Tall Person" topic of dialog.
This stops the previous lower priority activity "Provoke Smiling People"
The robot says, "How's the weather up there?". (When processing the word "up", animated speech does a looking up motion . . . .")
From this point forward, this weather topic can conversationally transition out to any other topics that could be activated within this one.
Or, if this topic runs out of conversation, it can exit. Which will then free up the mind module to make a decision to start a different activity based on the context.
H: Before the mind module focused the Dialog, it reconfigured BasicAwareness to use a distraction free tracking of the human (FullyEngaged mode) as this is the default for interactive priority. Autonomous Moves, and other mind module services are also reconfigured according to default interactive values.

Example 3

Consider User History

Assume that this is taking place on a different robot, the previous two examples are not connected.
1. A person enters zone 1, has a conversation with the robot about sports, and teaches their name to the robot, and they leave.
2. Later they come back. The robot remembers who they are, and mentions this, and this time will talk about winter, since sports was already done.
1A: The installed packages are as listed before.
1B: The state of memory is as follows:

| | |
|---|---|
| ActiveTimeslots | ["Afternoon"] |
| AverageBodyTemperature | 50 |
| BatteryPercent | 90 |

-continued

| | |
|---|---|
| FocusedActivity | " " |
| NumPeopleInZone | [1, 0, 0] |
| NumPeopleSmilingInZone | [0, 0, 0] |
| Month | 12 |
| MusicIsPlaying | False |
| OwnerVisibleAfterDelay | −1 |
| PeoplePresent | True |
| PresentLocations | ["Unknown"] |
| RobotBumpedIntoSomething | False |
| RobotHasBeenPushed | False |
| TrackedUserInZone | 1 |
| TrackedUserHeight | 170.0 |

1C: Based on those conditions, the following activities are possible:

| |
|---|
| Generic Small Talk |
| Propose Sports |
| Propose Winter Season |

1D: We don't have any history for this user.
Propose Sports, Propose Winter Season, and Generic Small Talk have each been focused once today.
1E: Each activity has equal weight after sorting, the order is randomized.
Propose Sports is the winner.

| |
|---|
| Propose Sports |
| Generic Small Talk |
| Propose Winter Season |

1F: Nothing to do.
1G: The mind module focuses the "Propose Sports" dialog topic.
The robot and human engage in a conversation about sports. During the conversation, the human asks "what is your name?".
This causes the dialog to directly tell the mind module to switch the focus to the "Generic Small Talk" topic.
In this part of the conversation, the robot learns that the human's name is "Lindsay".
Lindsay leaves the robot, which causes the dialog topic to exit.
1H: Before focusing the dialog, the other mind module services were configured with their interactive priority defaults.
2A: The installed packages are as listed before.
2B: The state of memory is the same as 1B.
2C: Based on those conditions, the following activities are possible:

| |
|---|
| Generic Small Talk |
| Propose Sports |
| Propose Winter Season |

2D: The tracked user is recognized as "Lindsay", and she has experienced once Propose Sports and Generic Small Talk.
Propose Sports, Propose Winter Season, have each been focused twice today.
Generic Small Talk has been focused 3 times.
2E: The sorted list is as follows.
Propose Winter Season is the winner.

Propose Winter Season
Propose Sports
Generic Small Talk

According to today's activity, Propose sports and Propose Winter Season are sorted above Generic Small Talk. Then after taking into Lindsay's history as the next sort, Propose Winter season is on the top.
2F: Nothing to do.
2G: The mind module focuses the "Propose Winter Season" dialog topic.
When the dialog sees that a topic is being focused, it sees that the user is different than last time. So it first greets and says "Hello Lindsay".
Then they continue with a conversation about winter.
2H: Before focusing the dialog, the other mind module services were configured with their interactive priority defaults.

Example 4

Autonomously Learn User Preference

Assume that this is taking place on a different robot, the previous three examples are not connected.
1. The robot is at home in the evening. A person who is registered an owner of the robot enters the room, the robot has not seen this person since the morning.
The robot comes to the person, hugs them, and says "Welcome home, I missed you".
The person says "I hate when you do that!"
2. The next day, the same scenario occurs, but this time the robot does not do anything.
1A: The installed packages are as listed before.
1B: The state of the memory provided by extractors is as follows:

| | |
|---|---|
| ActiveTimeslots | ["Evening", "Dinner"] |
| AverageBodyTemperature | 47 |
| BatteryPercent | 99 |
| FocusedActivity | " " |
| NumPeopleInZone | [0, 0, 1] |
| NumPeopleSmilingInZone | [0, 0, 0] |
| Month | 12 |
| MusicIsPlaying | False |
| OwnerVisibleAfterDelay | 25200 |
| PeoplePresent | True |
| PresentLocations | ["America", "Chicago", "Home", "Living Room"] |
| RobotBumpedIntoSomething | False |
| RobotHasBeenPushed | False |
| TrackedUserInZone | 3 |
| TrackedUserHeight | 171.0 |

1C: Based on those conditions, the following activities are possible:
Welcome Home to Family Member
1D: That activity has been run once before for this user, and has not been run today.
1E: The wining activity, which is also possible to launch, is "Welcome Home to Family Member"
Welcome Home to Family Member
1F: The autonomous activity is focused. The robot goes over to the user, and hugs them. It programmatically then starts the "Welcome Home Conversation" dialog topic.
1G: The robot then says "Welcome home John, I missed you". The person then says "I hate when you do that".
The dialog notifies the mind module that the user does not prefer the current activity.
1H: Before focusing the activity, the other mind module services were configured with their interactive priority defaults.
2A: The installed packages are as listed before.
2B: The state of the memory is the same as 1B. 2C: Based on those conditions, the following activities are possible:
Welcome Home to Family Member
2D: The history for this tracked user shows that he has launched this activity twice before, and that it received negative feedback from the user.
This activity has not ever been started today.
2E: Because of the negative feedback from the user, after sorting, the mind module comes up with an empty list. □
2F: Nothing to do.
2G: Nothing to do.
2H: Nothing to do.

Example 5

Autonomously Recharge and Priority

As the reader is expected to be familiar with the flow now, this example is provided with higher level explanation.
1. The battery has been less than 30 percent for over 30 seconds.
   No activities are focused.
   a. The mind module starts "Recharge Battery Casually".
      The robot starts to go back to it's charging station.
2. On the way there, the robot encounters a human in zone 1.
   a. The mind module starts "Generic Small Talk", which is a higher (interactive) priority and stops the (normal autonomous priority) recharge activity.
3. During the conversation, the battery goes below 7%.
   a. The mind module starts "Recharge Battery Critical", which is a higher (SafeGuard 1) priority, and stops the (interactive priority) Generic Small Talk.
4. The robot starts going to back to the recharging station again. Unfortunately, the robot is unable to find it or get there in time.
   The battery goes below 3%.
   a. The mind module starts "Low Battery Shutdown", which is a higher (SafeGuard 10) priority, and stops the (SafeGuard 1) Recharge Battery Critical
   b. The robot turns off.

Example 6

Overheat Safeguard

As the reader is expected to be familiar with the flow now, this example is provided with higher level explanation.
1. It is during the day, the robot has a full battery charge, and is not hot. A person is in the room and seen by the robot. They turn on some music and then leave.
   a. After the robot has heard music continuously for 30 seconds, the mind module starts "Autonomous Dancer".
      The robot starts to dance.
2. During this dance, the robots average body temperature goes above 90 degrees for more than a minute.
   a. The mind module starts "Critical Cool Down", which is a higher (SafeGuard 5) priority and stops the (normal autonomous priority) Autonomous Dancer.

3. After running this activity for awhile, the robot cools off.
   a. "Critical Cool Down" exits and the mind module is free to focus lower priority tasks again.
4. The robot could decide to start Autonomous Dancer again if music is still playing and a human has been around.

Example 7

Pushed Safeguard

As the reader is expected to be familiar with the flow now, this example is provided with higher level explanation.
1. The robot is running Autonomous Dancer again.
2. This time, someone sneaks up from behind and pushes the robot.
3. The "I was pushed" activity is focused
   a. The robot does a balancing algorithm, then turns to the direction of the push and complains to the person.
   b. The activity exits
4. The robot might focus Autonomous Dancer again next, or depending on the present conditions, a different activity.

The examples described above are given as illustrations of embodiments of the invention. They do not in any way limit the scope of the invention which is defined by the following claims.

The invention claimed is:

1. A humanoid robot comprising at least:
    a memory connected to a processor configured for retrieving and storing activities for execution by the robot, an activity composed of a pair of a pre-programmed behavior of the robot, the behavior being a combination of movements, words, lightings configured to express emotions of the robot and allow the robot to perform complex actions, and a manifest file with launch conditions of said behavior, said launch condition defining if the activity can be launched according to predefined conditions on one or more variables in the memory, and said activity having associated therewith a predefined priority;
    extractors of image, sound, touch and inertial signals characterizing one or more of a situation, an event and an interaction with a human being in a scene surrounding the robot;
    actuators of one or more action of a light signal, a displayed information, a sound, a speech, a movement, said one or more action belonging to a behavior; and
    a mind module for automatically:
        creating a prioritized list of activities according to predefined priorities comprising only activities whose launch conditions are met;
        filtering the prioritized list to remove activities that do not have the highest priority;
        randomizing the prioritized list, the prioritized list comprising two or more activities; and
        selecting the first activity in the prioritized list and commanding execution of said activity to one or more actuators.

2. The humanoid robot of claim 1, wherein the memory is further configured to store data allowing matching of an identification data of a human being with whom the robot interacts and predefined parameters of said interaction.

3. The humanoid robot of claim 1, wherein the prioritized list of activities is created based on one or more of a determination of a presence of a human being in a situation to communicate with the robot, a preference to conduct autonomous activity and a logic to perform any activity at all.

4. The humanoid robot of claim 3, wherein, after a determination of a presence of a human being in a situation to communicate with the robot has been made, a plurality of engagement zones are defined around the robot.

5. The humanoid robot of claim 4, wherein the plurality of engagement zones are defined by a distance between the human being and the robot.

6. The humanoid robot of claim 5, wherein the plurality of engagement zones vary based on an evolution of a context of an interaction between the human being and the robot.

7. The humanoid robot of claim 3, wherein after a determination of a presence of a human being in a situation to communicate with the robot has been made, an extractor service continuously tracks said human being during performance of said at least one activity.

8. The humanoid robot of claim 2, wherein the prioritized list of activities is created based on a determination of preferred activities of a human being with whom the robot has already interacted.

9. The humanoid robot of claim 2, wherein the order in the prioritized list of activities is set by firstly, taking into account constraints to safeguard the robot, secondly, a presence of one or more human being in one of the engagement zones, thirdly, activities which can be performed autonomously by the robot.

10. The humanoid robot of claim 9, further comprising a resource manager to contribute to the ordering of the list of prioritized activities.

11. A method for controlling a humanoid robot comprising:
    retrieving and storing activities for execution by the robot, an activity composed of a pair of a pre-programmed behavior of the robot, the behavior being a combination of movements, words, lightings configured to express emotions of the robot and allow the robot to perform complex actions, and a manifest file with launch conditions of said behavior, said launch condition defining if the activity can be launched according to predefined conditions on one or more variables in the memory, and said activity having associated therewith a predefined priority;
    retrieving from one or more extractors of image, sound, touch and inertial signals characterizing one or more of a situation, an event and an interaction with a human being in a scene surrounding the robot;
    activating one or more actuators of one or more action of a light signal, a displayed information, a sound, a speech, a movement, said one or more action belonging to a behavior;
    said method being further comprising automatically creating in a mind module a prioritized list of activities according to predefined priorities comprising only activities whose launch conditions are met, and:
        filtering the prioritized list to remove activities that do not have the highest priority;
        randomizing the prioritized list, the prioritized list comprising two or more activities; and
        selecting the first activity in the prioritized list and commanding execution of said activity to the one or more actuators.

12. A non-transitory computer readable medium comprising computer code including instructions that when executed by a computer cause the computer to automatically perform a method for controlling a humanoid robot comprising:

retrieving and storing activities for execution by the robot, an activity composed of a pair of a pre-programmed behavior of the robot, the behavior being a combination of movements, words, lightings configured to express emotions of the robot and allow the robot to perform complex actions, and a manifest file with launch conditions of said behavior, said launch condition defining if the activity can be launched according to predefined conditions on one or more variables in the memory, and said activity having associated therewith a predefined priority;

retrieving from one or more extractors of image, sound, touch and inertial signals characterizing one or more of a situation, an event and an interaction with a human being in a scene surrounding the robot;

activating one or more actuators of one or more action of a light signal, a displayed information, a sound, a speech, a movement, said one or more action belonging to a behavior;

said method being further comprising automatically creating in a mind module a prioritized list of activities according to predefined priorities comprising only activities whose launch conditions are met, and:
  filtering the prioritized list to remove activities that do not have the highest priority;
  randomizing the prioritized list, the prioritized list comprising two or more activities; and
  selecting the first activity in the prioritized list and commanding execution of said activity to the one or more actuators.

* * * * *